INVENTOR
DON H. RUNDLES

March 14, 1967 D. H. RUNDLES 3,309,234
BATTERY HEAT CONTROL BY-PASS VALVE
Filed Nov. 20, 1964 2 Sheets-Sheet 2
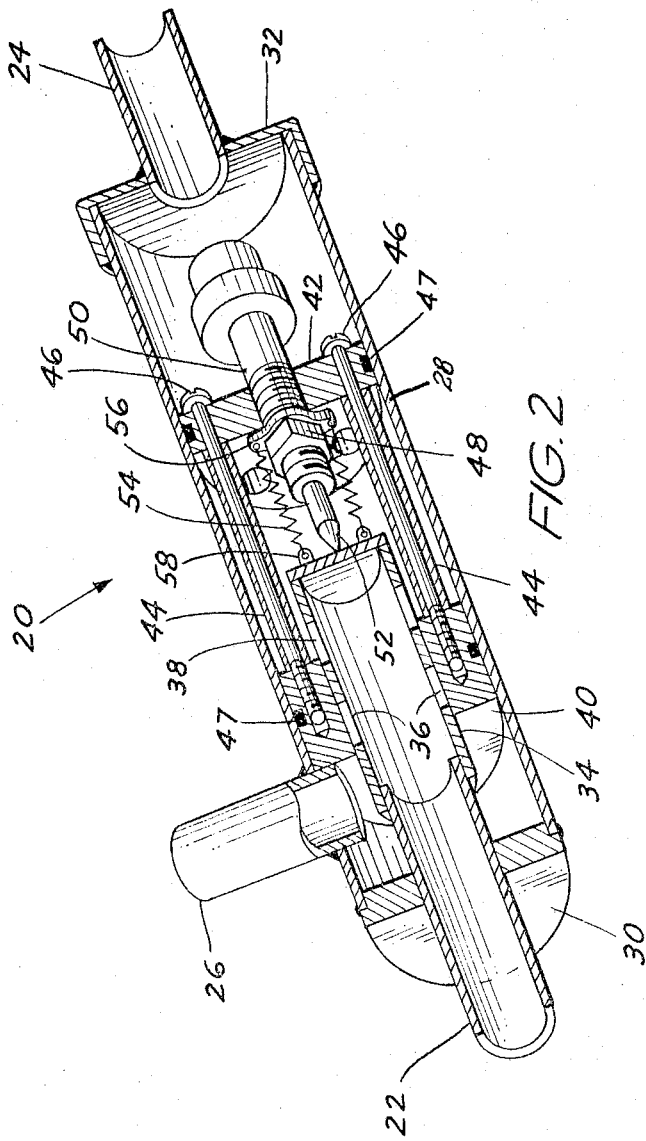
INVENTOR
DON H. RUNDLES
H. M. Saragovitz,
BY E. J. Kelly,
H. Berl &
P. A. Taucher ATTORNEYS

United States Patent Office 3,309,234
Patented Mar. 14, 1967

3,309,234
BATTERY HEAT CONTROL BY-PASS VALVE
Don H. Rundles, Roseville, Mich., assignor to the United States of America as represented by the Secretary of the Army
Filed Nov. 20, 1964, Ser. No. 412,889
3 Claims. (Cl. 136—161)

The invention described herein may be manufactured and used by or for the Government of the United States of America for governmental purposes without payment of any royalties thereon or therefor.

The present invention relates to a battery heat control by-pass valve and more particularly to a battery heat control by-pass valve automatically actuated by an internal thermostatic element.

Prior art valves used for the same, or similar purposes, are primarily of the solenoid type requiring a separate and remote thermostatic means for automatic control. Solenoids consume battery energy, a prime disadvantage in using solenoids, and since a remote thermostatic device is necessary, there is a greater possibility of malfunction due to broken probe points and lead wires.

The present invention is a mechanical device, integrated into a battery heat system, and having a self-contained thermostatic means. Because the device is wholly mechanical in operation, there is no demand on battery energy. The present invention further eliminates the need for remote thermostatic sensing probes, a probable source area of malfunction.

An object of the present invention is to provide a wholly mechanical valve having an integral thermostatic element.

A further object is to provide a valve which can be easily incorporated in and operate in conjunction with liquid cooled engine heating kits having the requirement of operating in temperatures of —25° F. to —65° F.

A final object of the present invention is the provision of a battery heat control by-pass valve which will prevent overheating of battery electrolyte, while maintaining electrolyte temperature adequate to produce high battery efficiency in ambient temperatures of —25° F. to —65° F.

Other objects and advantages of the invention will hereinafter become more fully apparent from the following description of the annexed drawings, which illustrate a preferred embodiment, and wherein:

FIG. 2 is an isometric cut away view of the by-pass valve embodying the present invention.

Figure 1:
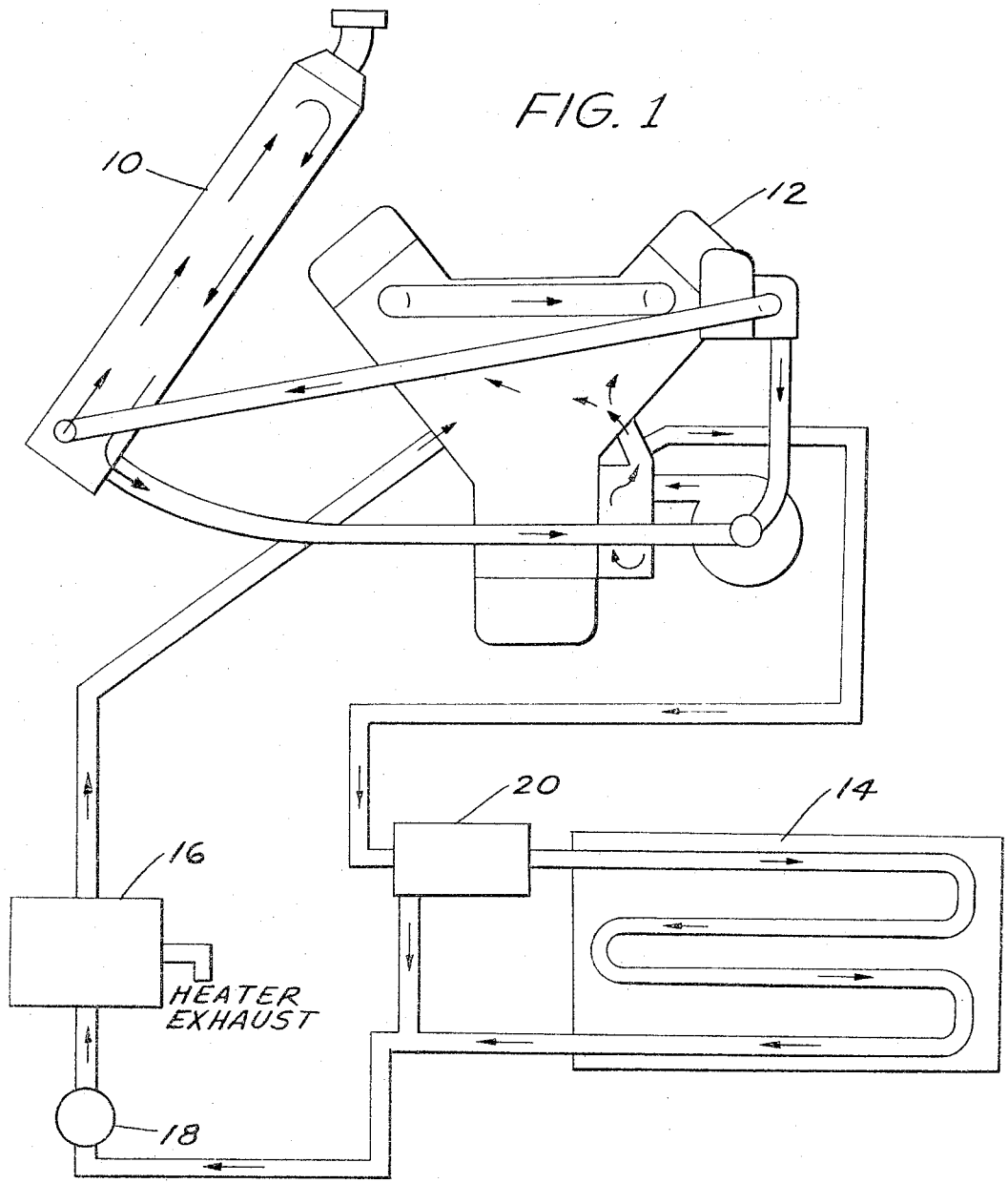
FIG. 1 illustrates a schematic of a typical liquid cooled engine and battery heating system depicting the position and relation of the heat control by-pass valve in the system.

The invention is a valve mechanism used in cold weather kits for vehicles having cold weather operating capabilities wherein hot water from the engine cooling system flows through the valve mechanism to a battery heating system thereby maintaining battery electrolyte at as near a constant temperature as possible. Upon the battery heating system reaching the desired temperature, thermostatic means of the instant invention automatically diverts the coolant, thereby preventing overheating of the battery electrolyte, and automatically provides for the heating of the battery compartment when the temperature therein becomes too low for optimum battery operability.

Referring now to the drawings, wherein like reference characters designate like or corresponding parts through the several views, there is shown in the FIG. 1 schematic, a typical liquid-cooled engine and battery compartment heating system as used in an ambient of —25° F. to —65° F., a radiator 10, engine 12 and battery compartment heat transfer means 14. Battery heat transfer means 14 are placed under the batteries of the vehicle and can be fabricated from copper tubing, or baffled sheet metal, the only requirement being that fluid flow fully therethrough. Also included in the heating system is a fuel burning heater 16, pump 18, the functions of these members being to supply necessary heat to the fluid in the system, and to keep the fluid in motion through the entire system as well as valve 20.

Battery by-pass unit 20, the specific feature of the invention, is shown more fully in FIG. 2, wherein member 20 has an inlet port 22, outlet port 24 and by-pass port 26 affixed to housing or body member 28 by welding or some other suitable means.

Housing member 28 is generally cylindrical in shape but may be fabricated in any convenient shape, and has end closure members 30, 32 which are generally water tight and wherein said end members provide a convenient mounting means for the inlet and outlet ports 22, 24, with said ports being centrally mounted in said end closure members.

Valve member 34 having orifices 36, 38 therein is slidably mounted within housing 28 by means of valve seat 40 and inlet port 22. Orifice 36 is a by-pass orifice, and orifice 38 freely admits fluid from input port 22, through valve 34 and the thermostatic element support member 42, and out through outlet port 24 to the battery compartment heating unit.

Support member 42 is affixed a distance from the valve support member 40 by means of spacers 44 and screws 46 and has a number of orifices therein which pass fluid from the valve member to the outlet port 24. Member 42, as well as 40, have neoprene gasket means 47 embodied therein, to prevent undesired leaks.

Centrally located in member 42 and held in place therein by nut 48 is a thermostatic element 50, which is generally made of brass and has an enclosed center section of wax which contracts and expands, depending on the temperature of the water flowing past the unit, and upon the temperature of the battery heater section reflecting heat therein back to the thermostatic unit.

Pin 52, a part of the thermostatic unit is in direct contact with valve member 34, wherein upon the wax expanding within the thermostatic unit, due to the heating of said unit, said pin pushes said valve toward inlet port 22, thereby closing orifice 38, and opening orifice 36, wherein the fluid flowing into inlet port 22 is by-passed from the battery heating means. Springs 54, which are held in position by washers 56, 58 pull the valve unit in the opposite direction upon the battery heating unit cooling thereby opening orifice 38 and closing 36 allowing fluid to flow into, and thereby once more heat the battery heating element.

In operation, heater 16 which is an auxiliary heater within the vehicle, is started upon the vehicle engine being turned off, wherein the fluid in the system is heated to, or maintained at a temperature range of 90°–200° F., depending upon the ambient outside temperature, and choice of heater. The heater fluid flows through the complete system as shown in FIG. 1 until the temperature through the battery heating unit, and around the thermostatic unit reaches a temperature in the range of 50°–80° F., which is the most efficient temperature at which the electrolyte gives maximum efficiency. At this time, pin member 52 causes valve 34 as hereinbefore explained to move so as to open orifice 36, and close orifice 38, causing the fluid to flow through by-pass port 26 back to the system, thereby preventing the battery electrolyte from overheating.

In order to maintain the electrolyte within the temperature range desired, fluid must periodically flow through heating unit 14, therefore, since no fluid is flowing by thermostatic unit 50, it cools, wherein the pin member 52 retracts, thereby allowing springs 54 to move valve 34 so that orifice 38 will be opened, 36 closed and fluid once more to flow into the battery heating unit. The operation of the valve continues, so long as the heater 16 is in operation. When the vehicle is in operation, the generator is naturally charging the battery, therefore the required electrolyte heat is applied by the generator.

Fins may be added to unit 20 in order to obtain faster cooling and therefore increased thermostatic element action.

The thermostatic element is a well known device and any similar element can be used, so long as it provides the proper reciprocating valve action.

Obviously, many modifications and variations of the present invention are possible in the light of the above teachings. It is therefore to be understood, that within the scope of the appended claims, the invention may be practiced otherwise than as specifically described.

Having thus described the invention, what is claimed is:

1. In a thermostatically controlled by-pass valve, an elongated valve body having inlet and outlet ports at opposite ends of said body and a by-pass port on the periphery thereof, support means within said body supporting a movable valve element and a thermostatic element between said inlet and said outlet ports, apertures in said movable valve element for directing fluid entering said inlet port to either said by-pass port or said outlet port depending upon the position of said movable valve element, and means attached to said thermostatic element for determining the position of said movable valve element.

2. In an apparatus for maintaining a predetermined temperature of the electrolyte in a storage battery, the combination of a compartment closely fitting said battery, means in said compartment for allowing the passage of a heated fluid through said compartment, and a thermostatically controlled by-pass valve comprising an elongated valve body having inlet and outlet ports at opposite ends of said body and a by-pass port on said body, fluid flow means connecting said outlet port with said compartment fluid passage means and for connecting said inlet port with a fluid heating means, support means within said body supporting a movable valve element and a thermostatic element between said inlet and outlet ports, said thermostatic element being sensitive to the temperature of fluid at said outlet port and moving said movable valve element in response to changes in temperature of the fluid, apertures in said movable valve element which direct the fluid to said outlet port or to said by-pass port depending upon the position of said movable valve element relative to said thermostatic element.

3. The apparatus of claim 2 wherein the apertures in said movable valve element are closed by the support means to cut off fluid flow to either said outlet port or said by-pass port.

References Cited by the Examiner
UNITED STATES PATENTS

| | | |
|---|---|---|
| 2,243,835 | 6/1941 | Brunner et al. |
| 2,419,630 | 4/1947 | Cruzan et al. _____ 137—468 X |
| 2,440,369 | 4/1948 | Furman. |
| 2,651,491 | 9/1953 | Ashton et al. _____ 251—210 X |
| 2,690,168 | 9/1954 | Nallinger _____ 136—161.1 X |
| 3,110,633 | 11/1963 | Bachmann _____ 136—161 |

WINSTON A. DOUGLAS, *Primary Examiner.*

D. L. WALTON, *Assistant Examiner.*